United States Patent [19]
Waters et al.

[11] 3,949,353
[45] Apr. 6, 1976

[54] UNDERGROUND MINE SURVEILLANCE SYSTEM

[75] Inventors: Kenneth H. Waters; James C. Fowler, both of Ponca City, Okla.

[73] Assignee: Continental Oil Company, Ponca City, Okla.

[22] Filed: June 23, 1975

[21] Appl. No.: 589,569

Related U.S. Application Data

[63] Continuation of Ser. No. 423,279, Dec. 10, 1973, abandoned.

[52] U.S. Cl.... 340/15.5 MC; 340/15.5 DS; 299/12; 340/181; 340/261

[51] Int. Cl.[2] .................... G01V 1/16; G01V 1/22

[58] Field of Search ............ 299/1, 12, 13; 61/45 R; 340/258 B, 261, 181, 5 C, 15.5 MC, 15.5 DS; 235/151.3, 153 AK

[56] References Cited

UNITED STATES PATENTS

| | | | |
|---|---|---|---|
| 3,111,655 | 11/1963 | Kotarsky | 299/12 |
| 3,450,225 | 6/1969 | Silverman | 340/15.5 DS |
| 3,474,405 | 10/1969 | Padberg | 340/261 |
| 3,513,465 | 5/1970 | Herington | 340/261 |
| 3,718,925 | 2/1973 | Donn et al. | 340/181 |

OTHER PUBLICATIONS

Mine Safety Appliances Co., Report No. Bu Mines OFR–N, (2)–1974 and OFR–17 (1)–74, 3/73.

*Primary Examiner*—Richard A. Farley
*Assistant Examiner*—N. Moskowitz
*Attorney, Agent, or Firm*—William J. Miller

[57] ABSTRACT

A system for maintaining a continuous log of activity in and around an underground mine wherein seismic energy in the area is continually monitored, processed and classified into meaningful relative data indications; and which system further includes selectively deployable seismic energy monitoring equipment providing more specific data in the event of mine catastrophy. This system utilizes permanently disposed seismic energy detectors and/or emergency detectors placed in accordance with the particular exigency, and detected seismic energy return is continually processed to maintain a data log indicative of general type and location of mine activity, with particular capability for isolation of unusual seismic events by comparison with statistical data constraints of predetermined character.

8 Claims, 7 Drawing Figures

PRINTER
VISUAL DISPLAY
ALARM
CENTRAL PROCESSING UNIT
MODE SELECTOR
AMPLIFIER AND DETECTOR
FILTERS
SIGNAL CONDITIONING NETWORK
EMERGENCY DETECTORS
AMPLIFIER AND LINE CONDITIONER
DETECTOR PATTERN

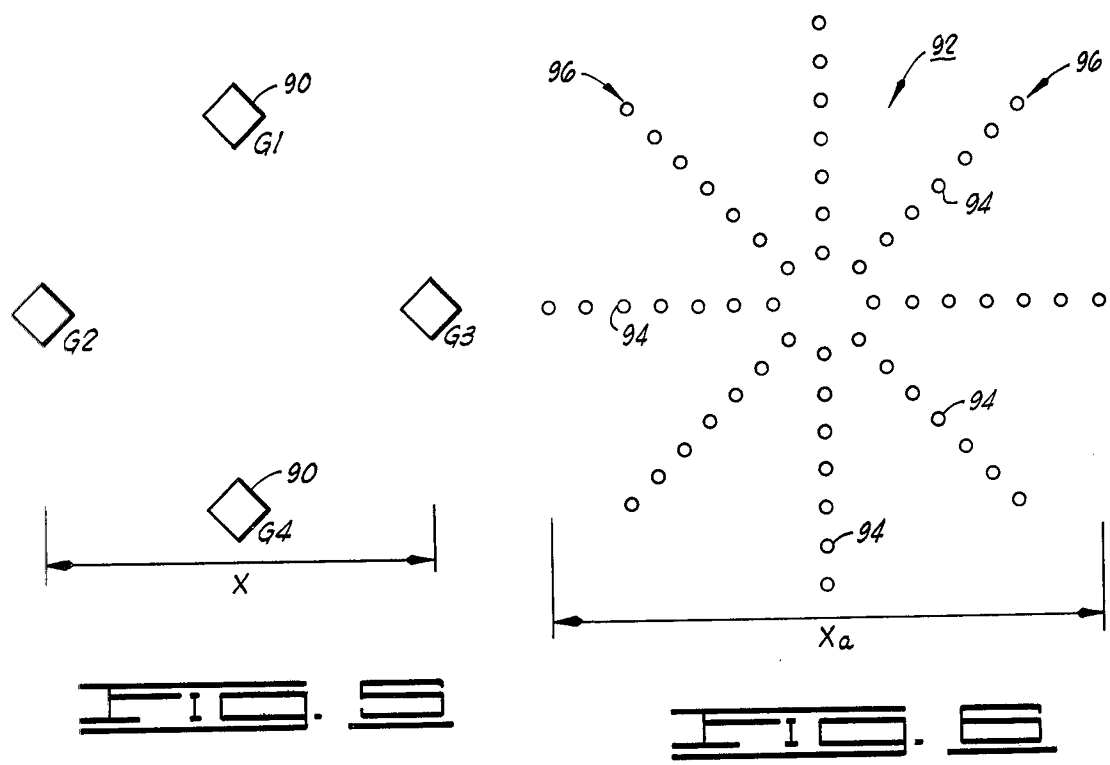
90
G1
G2
G3
90
G4
X
FIG. 5
92
96
96
94
94
94
94
Xa
FIG. 6
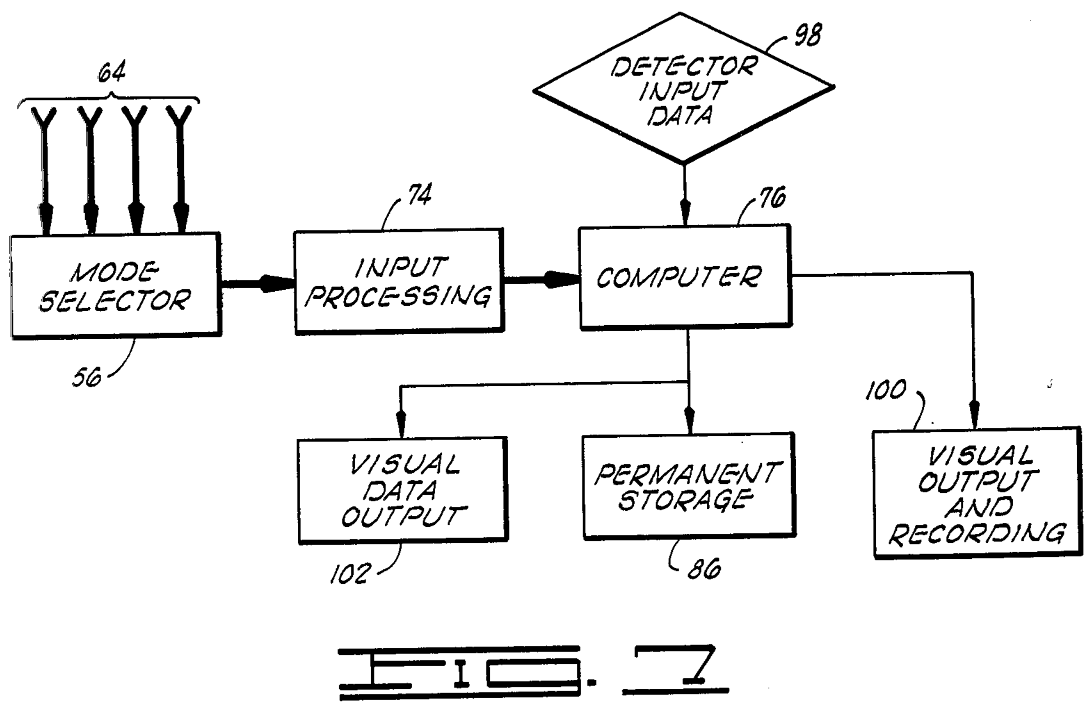
64
98
DETECTOR INPUT DATA
74
76
MODE SELECTOR
INPUT PROCESSING
COMPUTER
56
100
VISUAL DATA OUTPUT
PERMANENT STORAGE
VISUAL OUTPUT AND RECORDING
102
86
FIG. 7

UNDERGROUND MINE SURVEILLANCE SYSTEM

This invention resulted from work done under Contract No. H0133112 with the Bureau of Mines in the Department of the Interior and is subject to the terms and provisions of the President's Patent Policy Statement of Oct. 10, 1963.

This is a continuation of application Ser. No. 423,279, as filed on Dec. 10, 1973 in the name of the same inventor, and now abandoned.

BACKGROUND OF THE INVENTION

1. Field of the Invention

This invention relates generally to seismic energy monitoring systems for underground mines and, more particularly, but not by way of limitation, it relates to an improved system for maintaining continual surveillance and record of the mine operation and general condition with attendant capability of mine position in the event of catastrophy.

2. Description of the Prior Art

Various attempts to derive meaningful subterranean information relative to mine activity or emergency location needs are present in the prior art. There have been devised many forms of electrically actuated indicator apparatus for conveying a particular condition from a substerranean mine location to a surface station thereby to provide alarm or warning when necessitated. Such systems, however, have been limited to an actively operable transmission type of link, whether by electric wire, radio wave propagation or voice tube. Still other teachings have long dwelled on the possibility of some form of sound locating apparatus wherein acoustic energy is surfacd-detected to derive either message information or underground location information, but in general such devices have been rudimentary in nature and deployed in non-uniform, unique manner for each given instance. The closest prior art known to applicants in U.S. Pat. No. 3,132,330 in the name of Donner entitled "Electric Alarm Systems". This system utilizes a plurality of ground-disposed geophones for detecting subsurface disturbances which are individually connected to a particular alarm device characteristic of a surface position. This device provides no meaningful data short of an all-out alarm condition which, in many cases, may be too late to be of value in correcting the situation.

SUMMARY OF THE INVENTION

The present invention contemplates an underground surveillance system which utilizes a plurality of plural detector stations each connected to provide input to a central processing equipment to derive indications as to seismic signal directionality and velocity, and which further characterizes event data as particular forms of usual or unusual seismic events. The system functions to continually utilize real-time data processing to maintain a data log of the condition relative to the underground area and, in the event of catastrophy or other emergency requirements, additional seismic energy detectors and processing equipment may be utilized in combination to pinpoint underground problem areas.

Therefore, it is an object of the present invention to provide a mine surveillance system which enables derivation of a greater amount of pertinent data.

It is still another object of the present invention to provide equipment for surface detection of seismic energy and subsequent processing to determine the character of specific forms of seismic energy returned from an underground mine location.

It is yet another object of the invention to provide apparatus for maintaining a continual, real-time data log as to underground mine activity.

It is also an object of the present invention to provide apparatus for more rapidly locating an underground situs after a catastrophy or during a general emergency situation.

Finally, it is an object of the present invention to provide a complete and effective underground mine surveillance system capable of providing a maximum of information from evaluation of the seismic energy generated within the vicinity of the mine.

Other objects and advantages of the invention will be evident from the following detailed description when read in conjunction with the accompanying drawings which illustrate the invention.

BRIEF DESCRIPTION OF THE DRAWINGS

FIG. 5 is a schematic diagram of an array of geophone patterns as may be utilized during emergency operations relative to the system of FIG. 1;

FIG. 6 is a geophone pattern as may be employed during emergency operations; and FIG. 7 illustrates in block diagram emergency processing equipment as may be used in the system of FIG. 1.

DETAILED DESCRIPTION OF THE INVENTION

Figure 1:
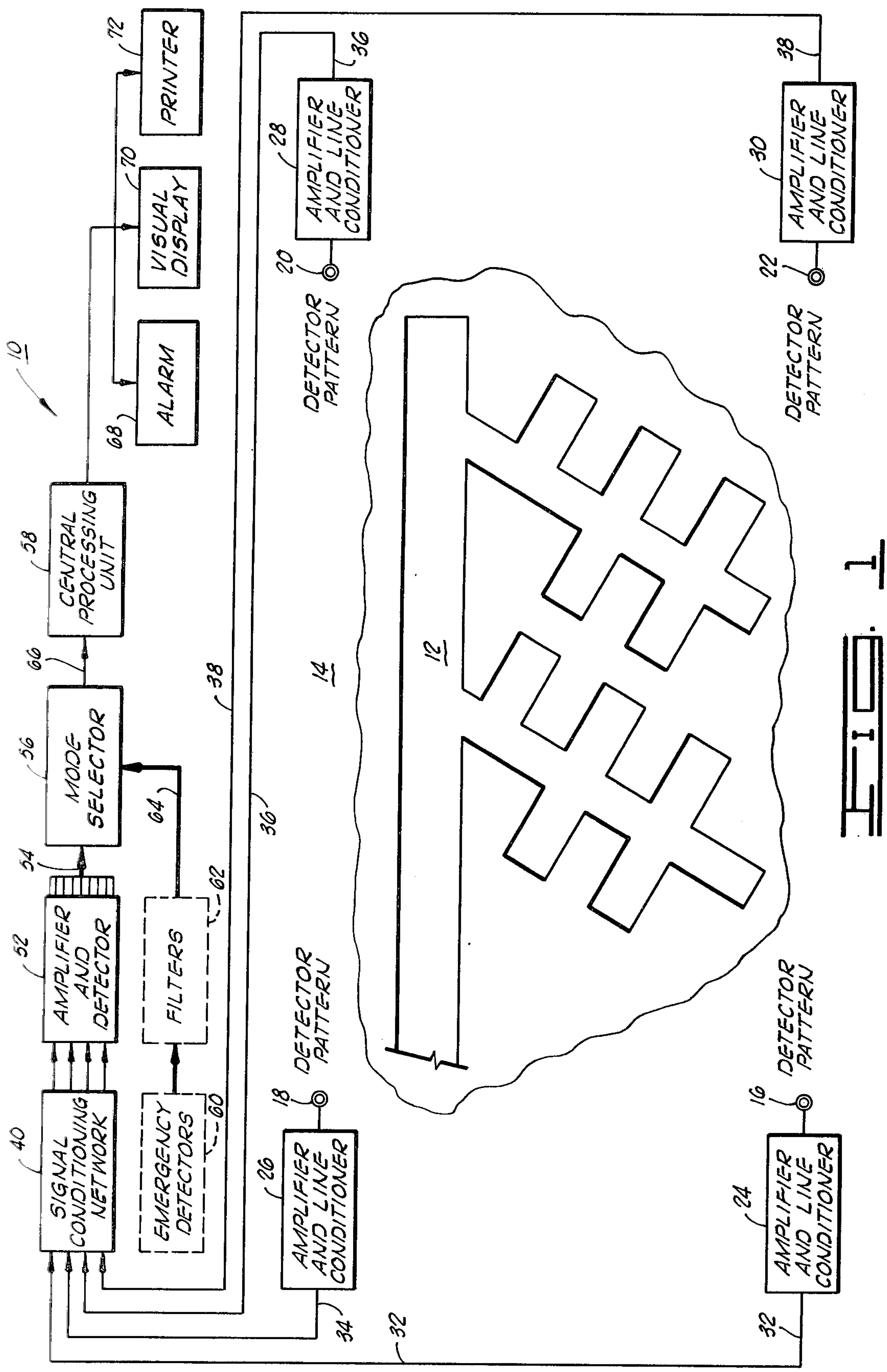
FIG. 1 is a functional block diagram of a mine surveillance system shown in relation to an underground mine location.

FIG. 1 illustrates a surveillance system 10 in block form in association with an underground mine system 12 beneath an earth surface location 14. Seismic detector stations 16, 18, 20 and 22 are strategically located in relatively wide-spaced relationship on the earth surface 14 in such disposition as to adequately cover the underground tunnel systems of mine 12. The seismic detector systems 18 through 22 each consist of a plurality of geophones or similar types of seismic energy detectors disposed in earth coupling relationship in predetermined array, as will be further described below. The seismic detector stations 16, 18, 20 and 22 are through connected to respective amplifier and line conditioner circuitry 24, 26, 28 and 30 which serve to amplify individual ones of input seismic signal from the respective seismic detector stations for later conduction via respective multiconductor cables 32, 34, 36 and 38 to a signal conditioning network 40.

Figure 2:
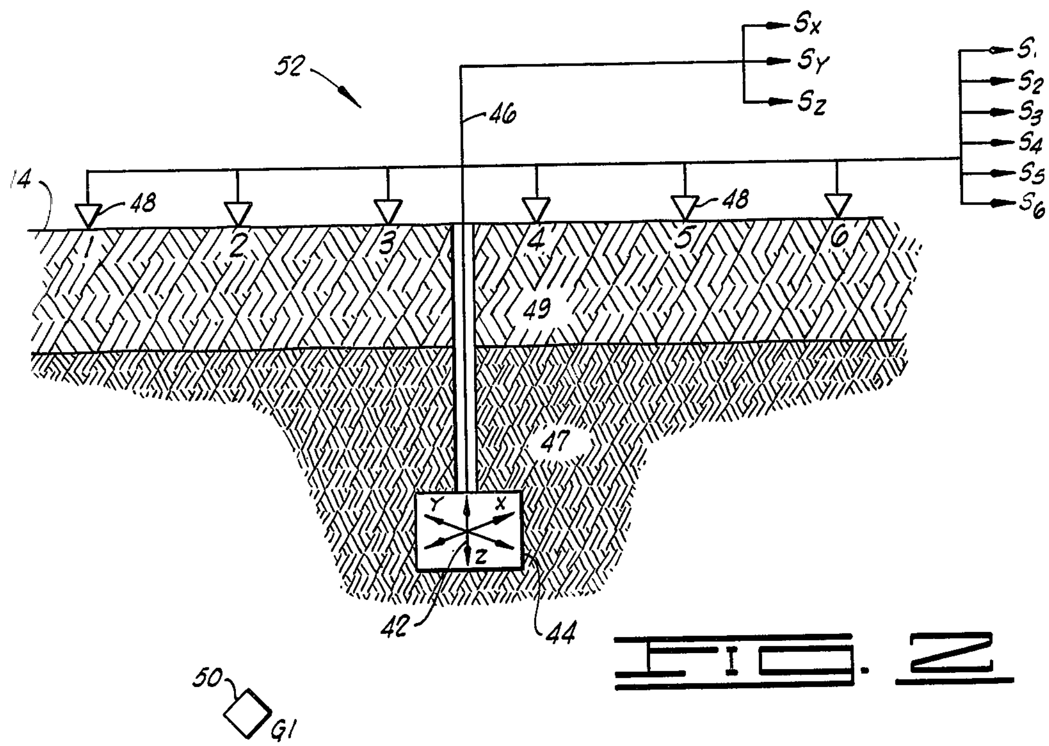
FIG. 2 is a sectional view of one form of detector layout as utilized in the present invention.

FIG. 2 illustrates one form of receiver array which may be utilized at seismic detector stations 16, 18, 20 and 22. For example, a detector station may consist of a three-dimentional geophone 42 of well-known type which measures seismic disturbance in three orthogonal directions. The orthogonal detector 42, a well-known and commercially available type of seismic detector, is preferably a water-proof installation cemented in a hole 44 within earth subsurface 47 and below the weathered layer 49. Orthogonally detected seismic disturbance is conducted via a cable 46 for input to amplifier and line conditioners 26–30 (FIG. 1) as designated by outputs $S_x$, $S_y$ and $S_z$.

The orthogonal geophones 42, or groups or such geophones 42, are then combined with additional geophones 48 which measure surface motion, and which geophones 48 are also arrayed in a form of surface pattern of well-known type. For example, geophones 48 may be disposed in a radial array having the property that they can receive seismic signals from all directions thereby to embody inherent data indications as to signal direction. Output from the surface geophones 48 is then conducted via cable 51 for input to amplifier and line conditioners 26 through 30 (FIG. 1) as indicated by outputs $S_1$, $S_2$, $S_3$, $S_4$, $S_5$ and $S_6$.

Figure 3:
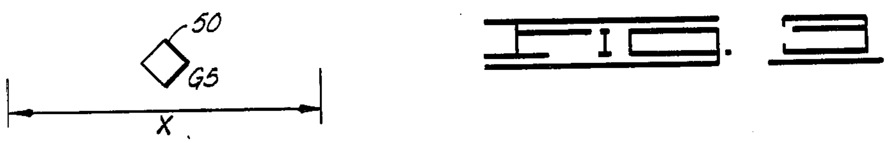
FIG. 3 is a schematic plan view of one form of geophone pattern array as may be utilized in the present invention.

The geophone patterns may be spread over a number of locations several hundreds of feet apart such that, with the geometrical disposition known, it provides a valuable property for later allowing source direction and distance to be determined. The patterns of geophones at each detector station 18–22 are subsets of a still larger final array, the totality of which will allow the maximum likelihood position of the signal source to be determined. Thus, the detector lay out at each seismic detector station 18–22 may take the form as shown in FIG. 3 wherein the plural arrays 50, i.e. G1–G5 is individually made up of subarray 52, as shown generally in FIG. 2. Depending upon the exigencies of the terrain and information application, the individual arrays 50 may include orthogonal triplets of geophones cemented down within the earth, or they may be a bunched surface nest of vertical geophones, or some combination of both. A typical distance of separation X for most surveillance operations would be a distance of 200 to 500 feet.

Referring again to FIG. 1, it becomes apparent that each of the amplifier and line conditioner stages 24 through 30 must consist of a larger number of individual channels of amplification for output via multi-conductor cables 32 through 38 to the signal conditioning network 40. It is contemplated that in some circumstances, such as rough terrain or distant spacing of detector patterns and a central position, it may be desirable to employ FM multiplex or equivalent transmission linkages for applying received geophone signals to signal conditioning network 40.

The signal conditioning network 40 again provides plural channels of amplification of specialized type well-known in the geophysical art for preconditioning each of the seismic signal inputs for input to an amplifier and detector stage 52. The signal conditioning network 40 may consist of a plurality of conventional seismic amplifiers for cleaning up each signal for input to amplifier and detector 52 which amplifies and threshold detects the signal from each channel to provide augmented event indication. The outputs from amplifier and detector bank 52 are then available via multi-conductor cable 54 to a mode selector 56 for further application as designated. Mode selector 56 may be such as a suitable switch board for routing the desired plurality of channel inputs to a central processing unit 58, as will be further described, for deriving output information as to the surveillance operation. Mode selector 56 is included for the purpose of switching ancillary emergency detection equipment as shown in dash-line block sequence including emergency detectors 60 and filters 62 with subsequent multi-conductor input 64 to mode selector 56. The emergency detection equipment will be further described below, specifically in relation to FIGS. 5, 6 and 7.

The central processing unit 58 is a digital computer equipment, either specialized or general purpose, of commercially available type which may be utilized to receive the plural channels of input via input connection 66 for analog to digital conversion and proper formatting for processing in the computer hardware, as will be further described. The processed output information from central processing unit 58 is then utilized to activate an alarm 68, a visual display 70 and, if desired, a selected peripheral printer 72.

Figure 4:
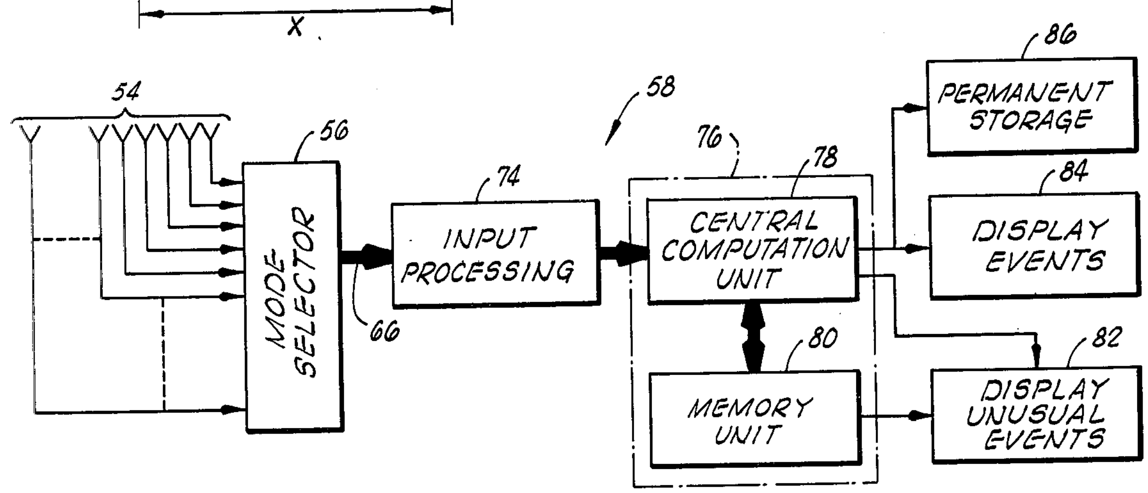
FIG. 4 is a block diagram of surveillance equipment as illustrated generally in FIG. 1.

More particularly, and referring to FIG. 4, the plural conductors of seismic event data on leads 54 are applied through mode selector 56, as set in the mine surveillance mode, to apply the seismic signal inputs to an input processing stage 74. The input processing 74 may be any of various commercially available equipments for utilization in preparing the seismic signal data for input to a computer 76 which would include a central computational unit 78 and memory unit 80 in interactive association. Input processing 74 may be a well-known form of analog to digital converter such as the peripheral converter unit available with a selected computer 76. One form which has been used successfully is the Model 980A Texas Instruments computer and associated peripherals. The Texas Instruments Silent 700ASR output terminal is used in conjunction. While any of various commercially available computational equipment may be utilized in carrying out the invention, it is preferable that a smaller, less expensive unit or even a specialized digital computer is sufficient for carrying out the method.

The computer 76 performs real time processing of the input seismic signal data and can perform simultaneously, or sequentially if so programmed, filtering of the incoming channels of seismic signal data. By comparison between pairs of data channels, computer 76 can establish a direction of arrival of the relevant seismic energy return. In some instances, it may be desirable to detect the arrival of both compressional waves and shear waves for like events; and in this case, a knowledge of the shear wave/compressional wave velocity ratio will allow the approximate distance of the source to be calculated. The memory unit 80 upon proper programming will allow, by continual update, the statistical averages of seismic wave forms for various types of wave, and it further enables the keeping of time-distance calibration tables for all input seismic signal data. A primary utility is to quickly analyze event data by the expedient of classifying an event on the basis of the best likeness to previously recorded events of known character. Memory unit 80 also allows more accurate location of events when the acoustic characteristics of the rock layers change; for example, such might be the situation wherein there is effected a compression by overlying hills or by new mining activity in the path of the wave, etc.

The chief methods of classifying "usual" and "unusual" events for the discriminate display are on a character and time duration basis. Thus, the signal associated with an explosion may have a sharp onset and may be over after a few tenths of a second. On the other hand, a mining machine has no sharp onset and will be continuous for several tens of seconds or longer. Amplitude spectrum may also be used, in which event, various forms of pattern recognition can be utilized to discover the most likely type of event. Such forms of pattern recognition may utilize correlation coefficient determination as against standard pre-recognized signal patterns and, thereafter, still further filtering and velocity recognition procedures can be utilized to accurately establish event type.

The continuous mine surveillance data as stored in memory unit 80 is capable of recording all of what may be termed usual events such as mining machinery in use, coal haulage machinery and other industrial disturbances; further, memory unit 80 will contain information as to the unusual events such as explosions, roof falls, strain and fracturing of rock formations in the vicinity, and other violent disturbances which might require emergency measures. The computer 76 upon detection of unusual event data provides output to an unusual events display 82. Display 82 may be such as a plan position indicator system (PPI) in which the spot of a cathode ray tube is brightened at the correct position of its scan to give instantaneous location of the event. The cathode ray tube may be electronically limited as to mine locations, or the face of the cathode ray tube may be overlaid by a mine map at proper scale and center alignment.

An additional display 84 of selected type may be utilized to show all event data for continuous monitor of the operation, and all event data is similarly placed in permanent storage 86 which may be a peripheral tape or disk storage equipment associated with computer 76. Thus, the storage and display capacity at a central control station provides a continuous data picture of the entire mine operation. In the event of a catastrophy, an immediate location of the catastrophy will be known within seconds, and steps may be taken to deploy the necessary emergency procedures and equipment to the proper location. Such determinations also include data derived from emergency detectors 60 (FIG. 1) and associated equipment, as will be further described below. It is also possible through data comparison to relate statistically, the occurrence of roof falls to locations where known strain and fracturing has been occurring in the past. Finally, all seismic disturbance data may be compared and evaluated to determine sequences of mining machine use and non-use, and to generally outline the intensity of subsurface activities in and about the mine.

As also shown in FIG. 1, emergency detectors 60 may be deployed about the mine surface area for particular usage in deriving a pin-point location of underground areas where men may be trapped after a cave-in or explosion. The seismic miner locating portion of the system utilizes seismic signals which may be produced by the trapped miners striking the walls or roof of the mine with a heavy object, e.g. a hammer striking some metal object which is well-coupled to the surrounding earth. In the event of an emergency, some or all of the permanent installation geophones, as shown in FIGS. 2 and 3, may be utilized in deriving seismic information, but it is more than likely that accurate determination will require a rapid setting up of more localized geophone patterns. FIG. 5 illustrates a square array of geophone patterns 90 such as may be transported to the general area of the mine in which men are believed to be trapped and then set up quickly to provide fast accurate location for the source of any seismic signals emanating from the trapping location. The value of X may be on the order ofo 300 to 500 feet, i.e. the distance diagonally across the array of patterns.

Individual geophone patterns preferably take the form as shown in FIG. 6. FIG. 6 illustrates a geophone pattern 92 consisting of a plurality of radial arrays of geophones 94, in this case the array includes eight radiating linear geophone arrays 96, but it should be understood that this can be varied in accordance with the requirements of the operations. The geophone groups can be further varied in deployment in a wide variety of configurations in accordance with the local noise conditions. In a high noise location, the pattern diameter $X_a$ should be on the order of 200 feet in order to give best response. In conditions of low ambient noise, the diameter $X_a$ may only need be on the order of 20 feet. The low noise configuration will provide for greater accuracy in locating the source of the signals but provides no signal-to-noise improvement in the case of larger seismic surface waves. Since the system is deployed in the general area of the trapped miners, there will be a sizable vertical component to the received seismic signals such that the configuration for high noise ($X_a$ = 200 feet) can be used to cancel surface waves without seriously attenuating the desired signals.

Processing of the emergency locator seismic signals proceeds in similar manner to that previously set forth utilizing input processing stage 74 and coomputer 76 to derive the requisite location output data. Thus, in referring to FIG. 7, geophone inputs from cable group 64, as may be derived from three or more patterns of geophones deployed in such a manner as to measure the ground motion at three or more locations proximate the entrapment, are applied through mode selector 56 to input processing 74. Mode selector 56 may be switched or adjusted to conduct the emergency locator signals through to input processing 74 wherein the signals are properly converted digital and formatted for input to computer 76. Detector input data stage 98 indicates read-in of the pertinent surface data relative to the geophone pattern locations as input to computer 76. Thereafter, the computer 76 ascertains time shifts between related received signals to calculate the location of the signal source by means of triangulation. Associated digital correlation equipment, peripheral to computer 76, may be utilized to ascertain all time shifts for subsequent calculation of the entrapped miners. When more than three geophone patterns are used, e.g. four patterns 90 as shown in FIG. 5, the computer 76 can utilize a "best fit" type of processing to locate the source with much greater accuracy than is possible with the three pattern mode of operation.

In the event that signal levels are extremely low in amplitude, computer 76 may be used to perform still more sophisticated operations on the data, e.g., deconvolution or normalization, wherein the processing enhances signal-to-noise levels prior to correlation of the signals to determine serial time shifts. Computer 76 operates in essentially real time condition to provide output data relating to pin-pointed mine location which may then be displayed on visual output and recording stage 100. In the case of an integrated system, this stage may be the same as display unusual event stage 82 in FIG. 4. Thus, the output display may be a PPI display with mine boundary overlay in calibrated affixure over the face thereof. The computer peripheral permanent storage 86 would still place all event data information, as well as the mine location data, in accessible permanent storage, and a visual data output 102 of selected type may be utilized to view all data.

Alternatively, the seismic signal data input from cable group 64 through mode selector 56 may be initially processed in analog form wherein the data is further filtered and correlated to ascertain the various time shifts as between geophones and geophone groups. In this event, both the analog received signals and the correlation results may be displayed for operator observation. Such display may take the form of an oscilloscope type of display, a paper plot of the data, or a conventional form of quick developing film display.

The overall surveillance and locating system, as outlined in FIG. 1, is capable of operating in real time conditions to continually provide output display of either continuous surveillance data or emergency location data. However, in the event that it is necessitated that localized geophone patterns be placed, the time element is lengthened by the time that it takes for placement of the geophone groups in the areas localized about the suspected entrapment site.

The foregoing discloses a novel mine surveillance system which has the capability of maintaining a continual data interpretation of mining conditions and activity in general, as well as having the added capacity for rapidly determining underground locations of trapped miners. The system enables data keeping for both usual and unusual seismic disturbances which occur in and around an underground mine such that the resulting data can be employed variously to further the effectiveness of the mining operation. Proper collection and evaluation of output data should enable operators to determine normal mine conditions and all other conditions varying therefrom, some of which might indicate impending trouble or disaster, in which event adequate precautionary measures can be taken.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A system for continual surveillance of an underground mine location having a tunnel system, said system comprising:

plural patterns of radially arrayed seismic energy receivers disposed in spaced locations of the earth's surface above said underground mine in predetermined relationship with respect to said tunnel system of said mine, wherein said radial arrays of receivers each consists of plural lines of equi-spaced geophones with the lines extending outward at selected equi-angular disposition from a selected point at the respective location;

means receiving and amplifying received signals from each of the plural radially arrayed receivers from each pattern to provide plural seismic signal outputs;

means receiving and time-orienting said plural seismic signal outputs to determine the character of seismic energy and directionality of received seismic signals; and means indicating said character of seismic energy and respective origin of said seismic energy within said underground mine location and the tunnel system thereof.

2. A system as set forth in claim 1 wherein each of said patterns comprising:

an array of plural orthogonal seismic energy receivers placed in waterproof installation below the earth's surface.

3. A system as set forth in claim 1 wherein each of said patterns comprises:

an array of plural surface-coupled geophones and a selected number of orthogonal seismic energy receivers arrayed in combination therewith.

4. A system as set forth in claim 1 wherein said means receiving comprises:

digital computation equipment for digitizing and receiving each of said plural seismic signal outputs to determine amplitude and duration characteristics as well as seismic energy source position and directionality of said received signals.

5. A system as set forth in claim 4 which is further characterized in that:

said digital computation equipment processes said plural digitized seismic signals to determine whether the signals are of usual or unusual character in relation to known signal characteristics of seismic disturbances.

6. A system as set forth in claim 1 which is further characterized to include:

additional plural patterns of seismic energy receivers movably disposed in localized locations of the earth's surface above a suspected problem area in said underground mine, said patterns each consisting of plural radial lines of plural equi-spaced geophones and said pattern having a preselected diameter.

7. A system as set forth in claim 1 which is further characterized in that:

the diameter of each of said plural patterns is made relatively small for installation over those selected spaced locations of the earth surface where there is a predetermined low ambient noise level, and relatively large over those spaced locations where there is a predetermined high ambient noise level.

8. A system as set forth in claim 7 which is further characterized in that:

said relatively small diameter is approximately 20 feet and said relatively large diameter is approximately 200 feet.

* * * * *